(12) United States Patent
Jiang et al.

(10) Patent No.: US 11,542,571 B2
(45) Date of Patent: Jan. 3, 2023

(54) LASER SHOCK AND SUPERSONIC VIBRATION EXTRUSION CO-STRENGTHENING DEVICE AND METHOD

(71) Applicant: JIANGSU UNIVERSITY, Zhenjiang (CN)

(72) Inventors: Yinfang Jiang, Zhenjiang (CN); Xin Li, Zhenjiang (CN); Wenfan Jiang, Zhenjiang (CN); Jianyun Huang, Chengdu (CN); Xuedong Gan, Chengdu (CN); Xu Li, Zhenjiang (CN); Hongfei Qi, Zhenjiang (CN); Wenjun Yu, Chengdu (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 1008 days.

(21) Appl. No.: 16/322,488

(22) PCT Filed: May 18, 2017

(86) PCT No.: PCT/CN2017/084796
§ 371 (c)(1),
(2) Date: Feb. 1, 2019

(87) PCT Pub. No.: WO2018/201521
PCT Pub. Date: Nov. 8, 2018

(65) Prior Publication Data
US 2021/0371950 A1   Dec. 2, 2021

(30) Foreign Application Priority Data

May 4, 2017   (CN) .................. 201710309505.X

(51) Int. Cl.
*C21D 10/00*   (2006.01)
*C21D 1/09*   (2006.01)
(Continued)

(52) U.S. Cl.
CPC .......... *C21D 10/005* (2013.01); *B23K 26/356* (2015.10); *B23P 9/04* (2013.01); *C21D 1/09* (2013.01); *C21D 2221/00* (2013.01)

(58) Field of Classification Search
CPC  B23K 26/356; B23P 9/04; C21D 1/09; C21D 10/00; C21D 10/005; C21D 2221/00
See application file for complete search history.

(56) References Cited

U.S. PATENT DOCUMENTS

| | | | |
|---|---|---|---|
| 3,657,910 A * | 4/1972 | Isobe | B21C 1/006 72/283 |
| 4,437,908 A | 3/1984 | Inoue | |
| 10,576,523 B1 * | 3/2020 | Lundquist | C22F 1/04 |

FOREIGN PATENT DOCUMENTS

| CN | 101628283 A | | 1/2010 |
|---|---|---|---|
| CN | 101942546 A | * | 1/2011 |

(Continued)

OTHER PUBLICATIONS

Machine translation of CN-106733571 Jing, Single excitation longitudinal bending composite vibration ultrasonic transducer, 2017 (Year: 2017).*

(Continued)

*Primary Examiner* — Brian W Jennison
*Assistant Examiner* — Abigail H Rhue
(74) *Attorney, Agent, or Firm* — Soroker Agmon Nordman Pte Ltd

(57) ABSTRACT

A laser shock and supersonic vibration extrusion co-strengthening device and method. The device comprises a laser assembly, a vibration assembly, a hydraulic assembly and a connecting assembly. The method strengthens a hole (7) formed in a metal sheet (5) simultaneously by laser shock strengthening and supersonic vibration extrusion strengthening; a mandrel (1) is in clearance fit with the hole to constrain the hole, so as to avoid distortion of the hole and (Continued)

a hole angle when the laser shock is performed on an outer surface of a workpiece and to improve the strengthening effect of a hole wall; when the laser shock is performed on the outer surface of the metal sheet, supersonic vibration is applied by the mandrel in the hole; and a three-dimensional pressure stress distribution nearby the hole wall at a certain depth is formed under an interaction produced by power ultrasound and laser shock waves having a certain frequency, amplitude and modality, so that an inner surface having higher anti-fatigue performance and being smoother is provided to the hole. Defects of a traditional strengthening process are overcome, and the problem in strengthening the hole separately through the laser shock or supersonic vibration extrusion is solved.

9 Claims, 5 Drawing Sheets

(51) Int. Cl.
*B23K 26/356* (2014.01)
*B23P 9/04* (2006.01)

(56) References Cited

FOREIGN PATENT DOCUMENTS

| CN | 101942546 | A | | 1/2011 | |
|---|---|---|---|---|---|
| CN | 102205488 | A | | 10/2011 | |
| CN | 102409157 | A | * | 4/2012 | |
| CN | 103014276 | A | | 4/2013 | |
| CN | 103710494 | A | | 4/2014 | |
| CN | 105729041 | A | | 7/2016 | |
| CN | 105734233 | A | | 7/2016 | |
| CN | 105861798 | A | | 8/2016 | |
| CN | 105886728 | A | | 8/2016 | |
| CN | 106191422 | A | | 12/2016 | |
| CN | 106733571 | A | * | 5/2017 | ............... B06B 1/06 |
| EP | 3399057 | A1 | | 11/2018 | |

OTHER PUBLICATIONS

Machine translation of CN 102409157 Huang, A hollow laser strengthening method, 2015 (Year: 2015).*
Machine translation of CN 101942546 Guan, A method and device for laser shock strengthening of fastening holes, 2011 (Year: 2011).*

* cited by examiner

LASER SHOCK AND SUPERSONIC VIBRATION EXTRUSION CO-STRENGTHENING DEVICE AND METHOD

TECHNICAL FIELD

The present invention belongs to the field of surface strengthening of parts, and provides a synergistic strengthening device and method for laser shock and ultrasonic vibration extrusion, which are mainly applied for strengthening hole with high stress concentration in industries such as aviation, aerospace, train and ship.

BACKGROUND ART

In the field of aerospace and so on, due to design, manufacture and assembly, hole structure will inevitably appear in parts. If the hole is not strengthened, the unstrengthened hole will become one of the danger sources causing fatigue damage of force-bearing position of the entire part, resulting in reduced safety performance and service life. The strengthening methods which are widely used at present include cold extrusion strengthening and laser shock strengthening, etc.

The mandrel direct cold extrusion technology is to force the mandrel to pass through the hole with a diameter slightly smaller than that of the mandrel, so that the wall of the hole is elasto-plastically deformed, thereby introducing residual stress on the surface of the hole wall, and improving the fatigue life of the hole. However, with regard to this technology, in the extruding process, the mandrel is in direct contact with the wall of the hole, the friction between them is large, and the plastic flow of metal on the surface layer of the hole wall is severe, resulting in scratches on the surface of the hole wall and breakage of the mandrel. Therefore, the ordinary mandrel cold extrusion technology cannot achieve the extrusion strengthening effect of effectively improving the high-strength metal small holes.

Patent CN102205488A describes a method of cold extruding machined hole with a slotted bushing. By adding a slotted bushing between the hole wall and the mandrel, the bushing is pressed by the mandrel, and the hole wall is then pressed by the bushing, in order to generate residual compressive stress around the inner hole to achieve a strengthening effect. However, in the extrusion process, the mandrel is easily broken, the process is complicated, and one bushing is consumed each time, resulting in a substantial increase in processing cost. And a large number of holes having a diameter of less than 3.5 mm cannot be strengthened by cold extruding, and the method is greatly limited with respect to holes with small diameter.

Laser shock strengthening is to adjust the stress distribution of the inner wall of the small hole by strengthening the surface of the material to achieve the effect of strengthening the small hole, but this adjustment is limited by many factors, especially the thickness of the material. Laser shock strengthening for small hole includes both single-sided shocking and double-sided shocking. After single-sided laser shock strengthening, there is tensile stress in the middle of the wall of the small hole, resulting in negative gain in the fatigue life. For the stress distribution of the hole wall, if the double-sided shocking has appropriate parameters, its effect is better than the single-sided shocking, and the "stress peak" distribution of the double-sided shocking is more inclined to the middle in the thickness direction of the sheet. However, tensile stress is generated near the surface of the sheet in both single-sided shocking and double-sided shocking. Therefore, for the small holes on the thick sheet, there is a defect in the laser shock strengthening that the middle of the hole wall cannot be strengthened. Moreover, in the actual production process, the shape of the workpiece is complex and variable, and the double-sided shocking is often difficult to realize, so its application is limited.

Patent CN101942546A describes a technology of strengthening small hole by laser shock, in which an energy absorption rod is placed at an appropriate position inside a small hole, and a laser pulse acts on the slope of the head of the energy absorption rod to induce plasma explosion to generate a shock wave acting on the inner wall of the small hole, thereby strengthening the small holes. However, this method cannot ensure that the small holes having a diameter of less than 3 mm are effectively strengthened.

Ultrasonic wire drawing is to couple the energy of ultrasonic wave to the wire drawing die through solid or liquid, and transmit it to the metal wire through the contact between the wire drawing die and the metal wire. The ultrasonic vibration has a great influence on the plastic deformation of the metal wire. Ultrasonic wire drawing can achieve good effects in reducing drawing force, increasing drawing speed, reducing friction, reducing die wear, prolonging die life, preventing biting and adhering to die wall, reducing wire breakage rate, improving steel surface quality and improving mechanical properties of material.

Ultrasonic vibration extrusion strengthening technology is to impact the surface of the part with the tool head having pressure (tension) and high frequency longitudinal impact force, so that the microscopic peaks and valleys on the surface of the workpiece are flattened, and the surface layer metal is plastically deformed and strengthened to form compressive stress. In turn, the surface fatigue strength of the part is enhanced. However, when the ultrasonic vibration extrusion is used to strengthen the small hole, the hole angle of the small hole cannot be effectively strengthened and is easily deformed.

Patent CN103710494A describes an ultrasonic-based small hole strengthening method and device, wherein, a piezoelectric ceramic column is placed at a suitable position inside a small hole, wherein the piezoelectric ceramic column is a vibrating component, and is connected to the ultrasonic generator after polarization. Through the rotation and radial movement of the piezoelectric ceramic column, the inner wall of the small hole is impacted to generate a certain plastic deformation to introduce residual stress, and the inner wall of the small hole is honed and strengthened. However, since the piezoelectric ceramic column requires very strict polarization treatment before use, the process is extremely complicated and there is a problem of uneven distribution of residual stress.

Patent CN105734233A provides an ultrasonic strengthening method for improving the fatigue life of a metal workpiece and application thereof. By clamping a metal workpiece on an ultrasonic processing machine tool, ultrasonic processing cutting tools are used for ultrasonic processing on the surface of the metal workpiece. The preset compressive stress on the metal surface is achieved by adjusting different pressures of the ultrasonic processing cutting tools on the processing working surface, and finally the purpose of eliminating the residual stress and improving the fatigue life is achieved. At the same time, the ultrasonic strengthening can refine crystalline grains on the surface of the metal workpiece, improve the surface microhardness, and improve the wear resistance and corrosion resistance. The strengthening method can only reduce the processing residual stress of the workpiece surface, cannot achieve significant strengthening, and is not suitable for the inner wall strengthening.

Patent CN10162828 discloses a tangentially telescopic ultrasonic torsion transducer, in which two symmetrically distributed drive assemblies generate a pair of stretching vibrations with the same frequency, amplitude and vibration direction in the tangential direction of the transducer. In turn, two connecting arms on the front cover body generate a pair of tangential vibrations with the same frequency and amplitude and the same vibration direction, so that the front cover body produces pure torsional vibration in the tangential direction, and a large amplitude torsional vibration is output after amplification by the amplitude-change pole, and the ultrasonic pure torsional vibration is obtained in a simple manner of tangential direct drive. This transducer relates to pure torsional vibration, cannot change the vibration mode, and cannot meet the requirements for hole strengthening.

DESCRIPTION

The object of the present invention is to provide a synergistic strengthening device and method for laser shock and ultrasonic vibration extrusion, directed to the defects of the above-mentioned strengthening technologies. It overcomes the defects of the traditional strengthening processes and solves the shortage of hole strengthened by single laser shock or single ultrasonic vibration extrusion. Through synergistic strengthening of the laser shock and ultrasonic vibration extrusion, the small hole is comprehensively strengthened. The problem of insufficient hole angle strengthening of ultrasonic vibration extrusion strengthening is solved, and the problems of tensile stress in the middle of the hole wall during laser shock strengthening and the limitation in hole size are solved, the problem that the material strengthening effect of the laser shock strengthening for material with large thickness is not obvious is solved. Moreover, the method can improve the surface quality of the hole wall, and the process is simple.

The technical solution of the present invention is: in order to achieve the above objects, the method of the present invention simultaneously performs laser shock strengthening and ultrasonic vibration extrusion strengthening on the opened holes in the sheet, and finally mandrels with axial tensile force and radial ultrasonic vibration pass through the holes continuously and uniformly, so that the holes have a higher fatigue resistance and a smoother inner surface.

A synergistic strengthening device for laser shock and ultrasonic vibration extrusion comprises a laser assembly, a vibration assembly, a hydraulic assembly and a connecting assembly.

The laser assembly comprises an absorbing layer, a constraining layer, a laser beam and a laser device; the absorbing layer is placed on the upper surface of the metal sheet, the constraining layer is placed above the absorbing layer, and the laser device is located above the metal sheet and emits a laser beam to strengthen the hole on the upper surface of the metal sheet by laser shock;

The vibration assembly includes a mandrel, a transducer and an ultrasonic generator; the mandrel includes a connecting section, a guiding section, a fitting section, a front cone section, a working ring and a rear cone section which are sequentially connected; the ultrasonic generator is electrically connected to the transducer.

The hydraulic assembly includes a cylinder barrel, a piston rod, a piston, a cylinder body and a hydraulic pump station, the piston rod is mounted inside the cylinder barrel, one end of the piston rod is connected to the piston, and the other end of the piston rod is connected to a rear cover plate of the transducer through a connecting sleeve and installed in a bracket body, the cylinder body is connected to the hydraulic pump station by an oil pipe.

The connecting assembly comprises a clamp, a worktable, a front end cover, a sleeve, a transducer guiding sleeve, a connecting sleeve, a bracket body and a rear end cover; the clamp is mounted on the worktable, and the front end cover is connected to one end of the sleeve, the other end of the sleeve is in threaded connection with one end of the transducer guiding sleeve, the transducer guiding sleeve is mounted on the working table, one end of the bracket body is connected with the other end of the transducer guiding sleeve, the other end of the bracket body is connected to the lower end of the cylinder body, and the rear end cover is mounted on the upper end of the cylinder body; the connecting section of the mandrel is connected to the transducer and mounted in the transducer guiding sleeve, and the transducer guiding sleeve is mounted above the worktable.

In the above solution, the axial length of the front cone section and the rear cone section of the mandrel is not more than 15 mm, the surface roughness Ra of the front cone section and the rear cone section is ≤0.2 μm, and the front cone angle and the rear cone angle are 2.5-4°; and the surface roughness Ra of the working ring is ≤0.1 μm.

In the above solution, the transducer includes a front cover plate of the transducer, pre-tightening screws, piezoelectric ceramics, electrode sheets, a rear end cover of the transducer, insulating tubes and insulating sheets.

The connecting section of the mandrel is in threaded connection with the front cover plate of the transducer, and the insulating sheet, the electrode sheet and the piezoelectric ceramic are sequentially arranged on the front cover plate of the transducer, and the electrode sheet is installed between each pair of piezoelectric ceramics, the uppermost piezoelectric ceramic is sequentially connected with the electrode sheet, the insulating sheet and the rear end cover of the transducer, and the various parts of the transducer are connected by a pre-tightening screw, and the outer surface of the pre-tightening screw is covered with an insulating tube.

A method according to the synergistic strengthening device for laser shock and ultrasonic vibration extrusion, which uses laser shock strengthening and ultrasonic vibration extrusion strengthening to strengthen the opened holes in the metal sheet simultaneously, and the mandrel is in a clearance fit with the hole to constrain the hole, in order to prevent the distortion of the hole and the hole angle when the laser shocks the outer surface of the workpiece, and to increase the strengthening effect of the hole wall; when the laser shocks the outer surface of the metal sheet, the mandrel in the hole applies ultrasonic vibration, power ultrasound with a certain frequency, amplitude and mode interacts with the laser shock wave to form a three-dimensional compressive stress distribution at a certain depth near the hole wall, including the following steps:

S1. Pretreating the outer surface of the metal sheet with opened hole, firstly providing an absorbing layer on the outer surface of the metal sheet, and then providing a constraining layer on the absorbing layer;

S2. Selecting the type and size of the mandrel according to the size of the hole, and loosely fitting the fitting section of mandrel with the hole;

S3. After the axis of the mandrel is aligned with the axis of the hole, the mandrel is passed through the hole, the connecting section of the mandrel is connected with the transducer, and the rear cover plate of the transducer is connected with the piston rod of the hydraulic assembly;

S4. Connecting the ultrasonic generator with the transducer electrically, setting the vibration mode and parameters of the ultrasonic generator, and turning on the ultrasonic generator so that the mandrel generates the mode of ultrasonic vibration;

S5. Adjusting the spot shape, the spot size and the laser power density of the laser device, and performing laser shock strengthening on the outer surface around the hole while the mandrel generates the mode of ultrasonic vibration;

S6. After the laser shock is completed, turning on the hydraulic pump station, starting the hydraulic assembly, passing the mandrel through the hole slowly, turning off the ultrasonic generator, and finishing synergistic strengthening for laser shock and ultrasonic vibration extrusion.

In the above solution, in the step S1, the absorbing layer is an aluminum foil, and the constraining layer is water.

In the above solution, in the step S2, the fitting tolerance of the fitting section and the hole is H6/h5, H7/h6, H8/h7 or H9/h9.

In the above solution, in the step S4, the ultrasonic generator adopts a breathing vibration; the ultrasonic vibration frequency is 15 to 60 kHz, the alternating radial amplitude is 2 to 40 μm; and the velocity of the mandrel through the hole is 10 to 50 mm/min.

In the above solution, in the step S5, the laser shocking position of the laser device is around the circumference of the hole, and the circumferential spot overlap ratio and the radial spot overlap ratio are both greater than 50%.

In the above solution, in the step S5, the laser incident angle of the laser device is greater than 60°.

In the above solution, in the step S6, the ultrasonic extrusion strengthening between the mandrel and the hole is finished by mutual extruding between the working ring of the mandrel and the hole, and the ultrasonic extrusion allowance is maintained at 1% to 6%.

The main function of the laser assembly of the present invention is to perform laser shock strengthening. The main function of the vibration assembly is to provide radial ultrasonic vibration. The main function of the hydraulic assembly is to subject the vibrating assembly to axial tension so that the mandrel can be passed through the hole to finish strengthening. The main function of the clamp is to position the hole and clamp the metal sheet.

Compared with the prior art, the beneficial effects of the present invention are:

1. The present invention simultaneously performs laser shock strengthening and ultrasonic vibration extrusion strengthening on the opened holes of the metal sheet, and finally the mandrel with axial tensile force and radial ultrasonic vibration passes through the hole continuously and uniformly, and the hole is made to have higher fatigue resistance and a smoother inner surface, the limitation of size of the small hole is overcome, and the hole of any size can be strengthened.

2. The present invention overcomes the defects of single laser shock strengthening or single ultrasonic vibration extrusion strengthening, so that residual compressive stress is formed on the metal component from the surface of the hole to deep of the inner wall, the stress distribution is more reasonable, and the middle of the hole wall and the hole angle can be effectively strengthened.

3. The present invention solves the shortage of the traditional cold extrusion strengthening, reduces the pressing force of the mandrel, improves the extrusion amount, and avoids the phenomenon of mandrel breakage during the strengthening process, and the surface of the hole wall is smoothed after the strengthening, and the fatigue life is greatly improved.

4. The present invention also solves the problem that the engineering structural member cannot be strengthened by double-sided laser shock, and obtains no gain from the single-sided laser shock strengthening, so that the stress concentration hole structure of the engineering structural member is effectively strengthened.

5. The present invention has the characteristics of simple structure, simple process and convenient operation.

Figure 9:
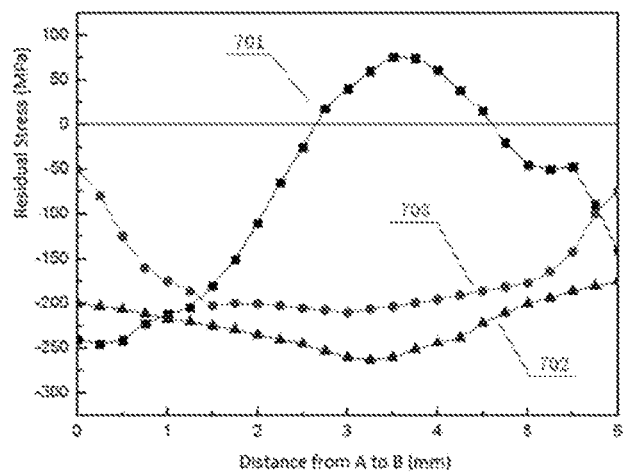
FIG. 9 is a comparison diagram of stress distribution of the hole wall according to an embodiment of the present invention.
Figure 10:
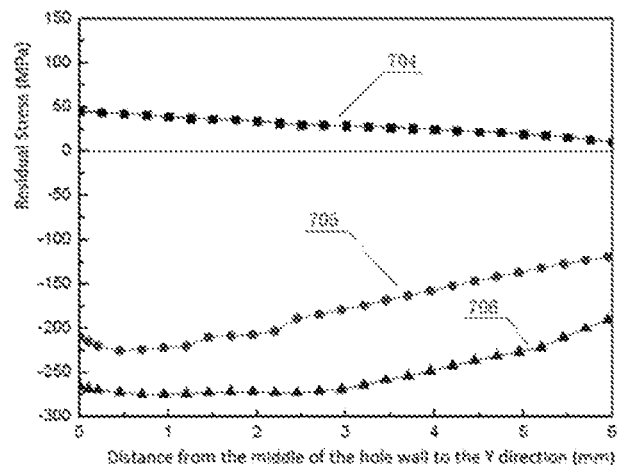
FIG. 10 is a comparison diagram of stress distribution in the middle section of the hole wall according to an embodiment of the present invention.
Figure 11:
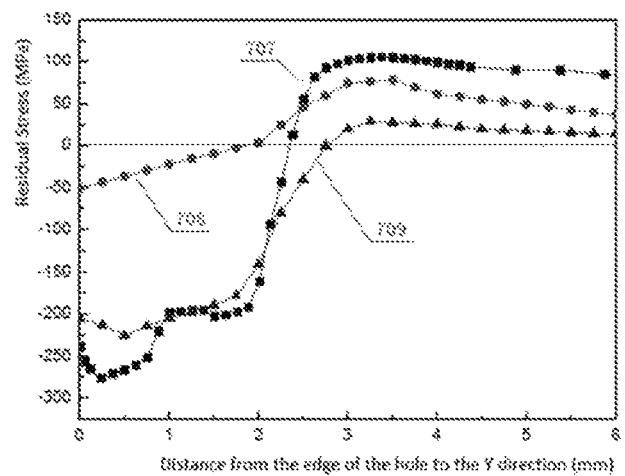
FIG. 11 is a comparison diagram of surface stress distributions according to an embodiment of the present invention.

In the figures, 1, mandrel; 101, connecting section; 102, guiding section; 103, fitting section; 104, front cone section; 105, working ring; 106, rear cone section; 2, absorbing layer; 3, constraining layer; 4, laser beat; 401, laser incident angle; 5, metal sheet; 501, surface A of the metal sheet; 502, surface B of the metal sheet; 6, spot; 7, hole; 8, clamp; 9, worktable; 10, front end cover; 11, sleeve; 12, transducer guide sleeve; 13, transducer; 14, laser device; 15, connecting sleeve; 16, cylinder barrel; 17, screw; 18, ultrasonic generator; 19, bracket body; 20, piston rod; 21, piston; 22, nut; 23, cylinder body; 24, seal ring of rear end cover; 25, rear end cover; 26, hydraulic pump station; 27, front cover plate of the transducer, 28, pre-tightening screw; 29, piezoelectric ceramic; 30, electrode sheet; 31, transducer rear cover plate; 32, insulating tube; 33, insulation;

In FIG. 9, the curve 701 is the stress of the hole wall strengthened by the laser shock; the curve 702 is the stress of the hole wall which is synergistically strengthened by laser shock and ultrasonic vibration extrusion; and the curve 703 is the stress of the hole wall strengthened by the ultrasonic vibration extrusion;

In FIG. 10, curve 704 is the stress of the middle section of the hole wall strengthened by laser shock; curve 705 is the stress of the middle section of the hole wall strengthened by ultrasonic vibration extrusion; curve 706 is the stress of the middle section of the hole wall which is synergistically strengthened by laser shock and ultrasonic vibration extrusion:

In FIG. 11, curve 707 is the stress of the surface strengthened by laser shock; curve 708 is the stress of the surface strengthened by ultrasonic vibration extrusion; and curve 709 is the stress of the surface synergistically strengthened by laser shock and ultrasonic vibration extrusion.

EMBODIMENTS

The present invention will be further described in detail below with reference to the drawings and embodiments, but the scope of the invention is not limited thereto.

The invention strengthens an opened hole 7 of a metal sheet 5 by laser shock strengthening and ultrasonic vibration extrusion strengthening, and mandrel 1 is in a clearance fit with the hole 7 to restrain the hole 7, in order to prevent distortion of the hole and the hole angle when the laser shocks the outer surface of the workpiece, and to improve the strengthening effect of the hole wall; when the laser shocks the outer surface of the metal sheet 5, the mandrel 1 in the hole 7 applies ultrasonic vibration, and power ultrasound with a certain frequency, amplitude and mode interacts with the laser shock wave, to form a three-dimensional compressive stress distribution at a certain depth near the hole wall.

Figure 1:
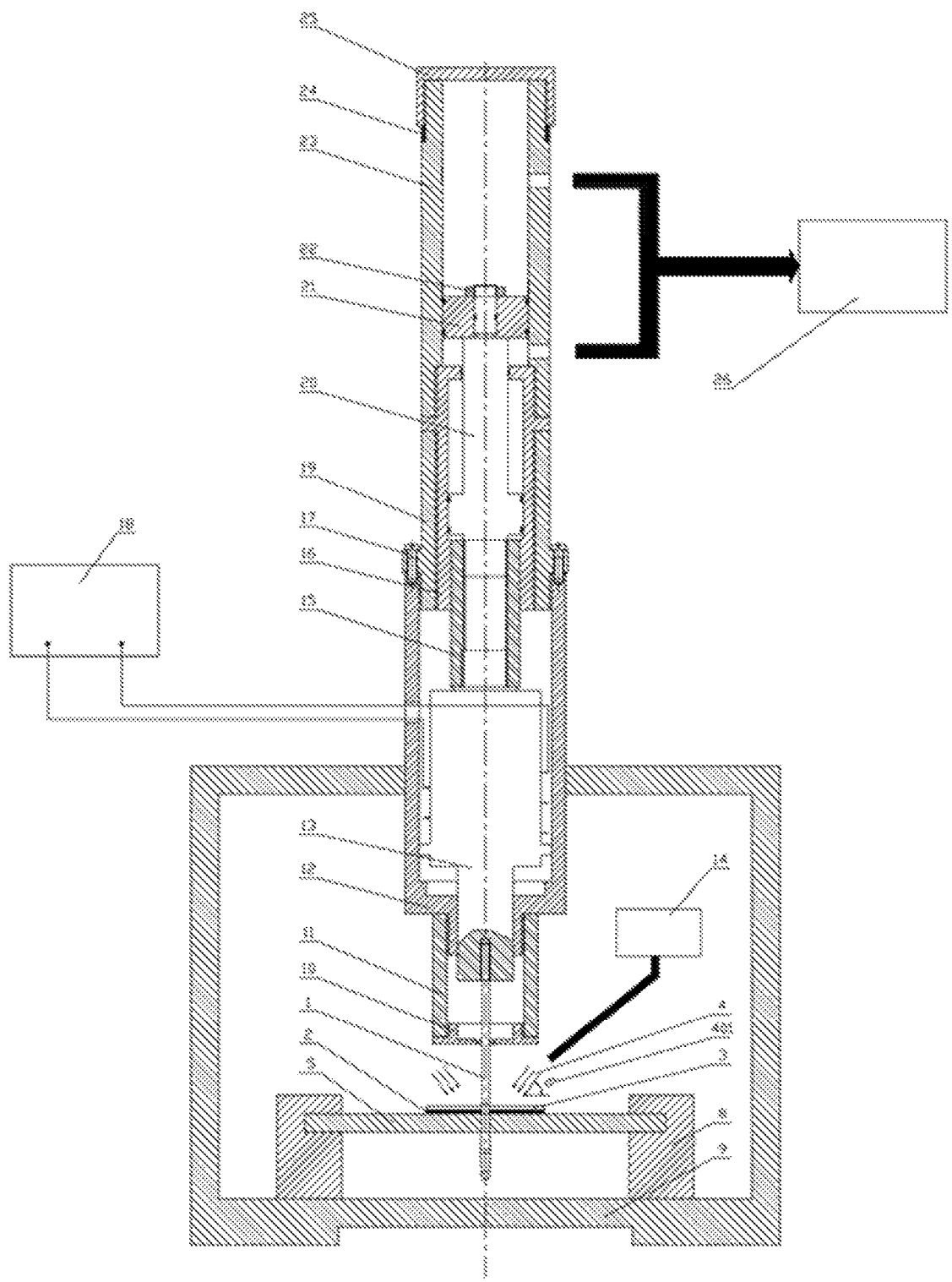
FIG. 1 is a schematic view showing the structure of synergistic strengthening device for laser shock and ultrasonic vibration extrusion according to an embodiment of the present invention.

FIG. 1 shows an embodiment of a synergistic strengthening device for laser shock and ultrasonic vibration extrusion according to the present invention, the synergistic strengthening device for laser shock and ultrasonic vibration extrusion comprising a laser assembly, a vibration assembly, a hydraulic assembly and a connection assembly.

Figure 2:
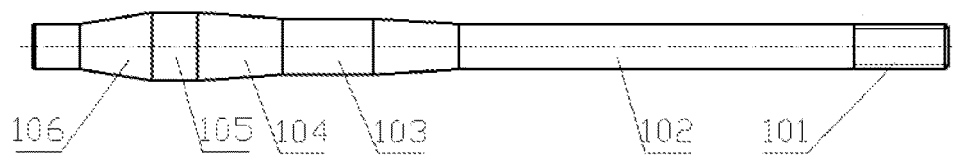
FIG. 2 is a schematic view of the mandrel according to an embodiment of the present invention.

The mandrel 1 used in the present invention is shown in FIG. 2. The mandrel 1 comprises, in order, a connecting section 101, a guiding section 102, a fitting section 103, a front cone section 104, a working ring 105 and a rear cone section 106. The axial length of the front cone section 104 and the rear cone section 106 is not more than 15 mm, and the surface roughness Ra of the front cone section 104 and the rear cone section 106 is ≤0.2 μm, the front cone angle and the rear cone angle are 2.5-4°, and if the cone angle is too large, the guiding property of the mandrel 1 is poor; if the cone angle is too small, the surface quality of the hole 7 is easily affected. The diameter of the working ring 105 is determined according to the size of the hole to be strengthened. The diameter tolerance is less than 0.005 mm, and the surface roughness Ra of the working ring 105 is ≤0.1 μm.

Figure 3:
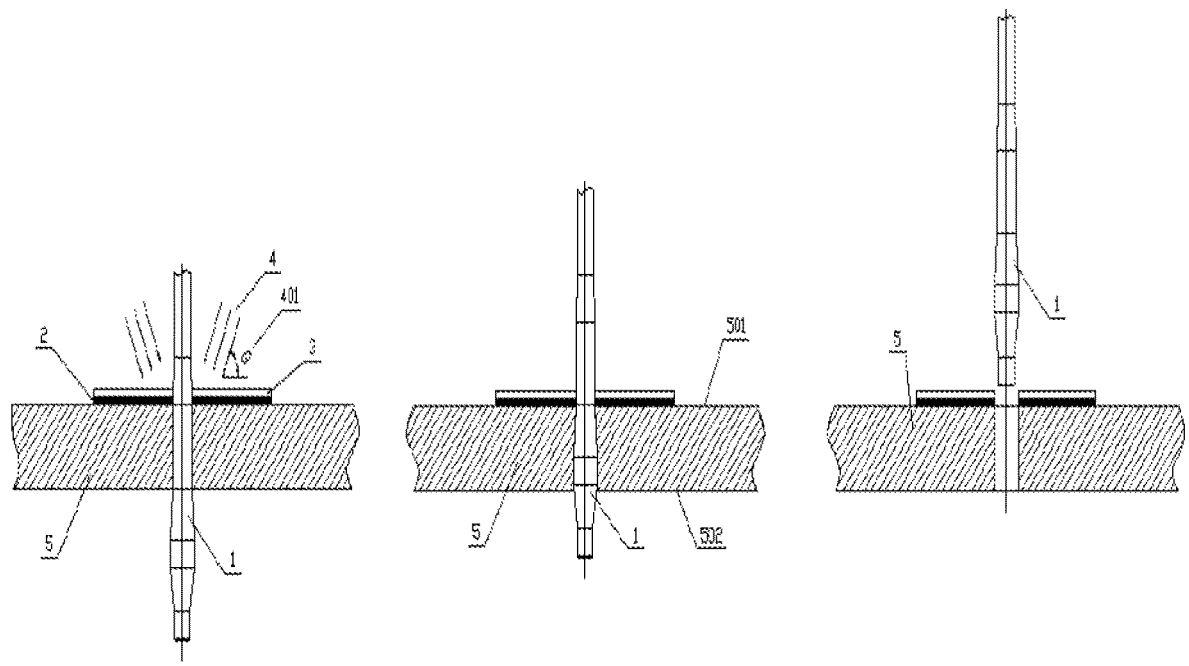
FIG. 3 is a schematic view of a strengthening process according to an embodiment of the present invention.
Figure 4:
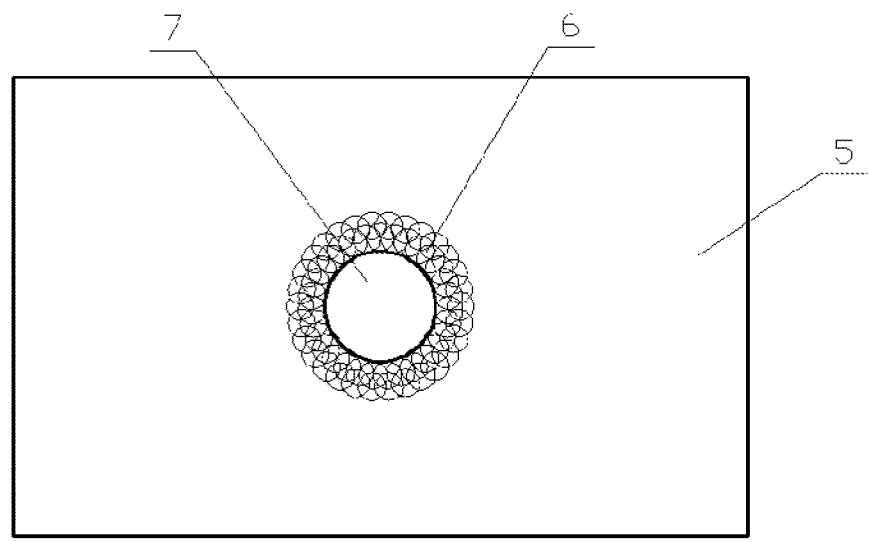
FIG. 4 is a schematic view showing location distribution of spots for laser shock strengthening and hole according to an embodiment of the present invention.
Figure 5:
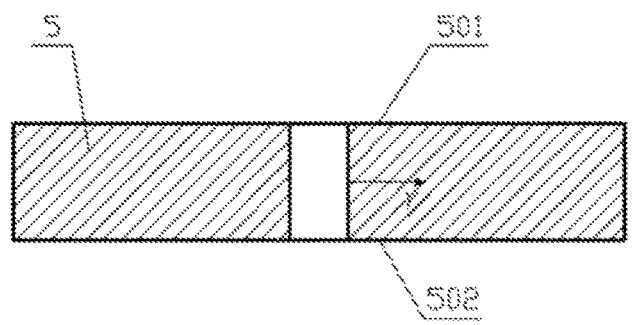
FIG. 5 is a side cross-sectional view of a metal sheet with a hole according to an embodiment of the present invention.
Figure 6:
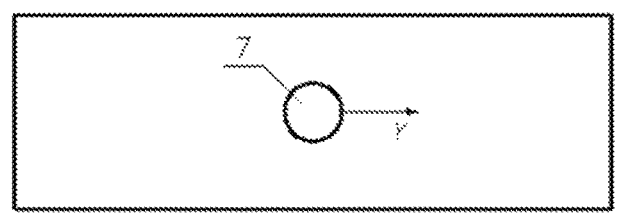
FIG. 6 is a top view of a metal sheet with a hole according to an embodiment of the present invention.

The principle of the synergistic strengthening method for laser shock and ultrasonic vibration extrusion of the present invention is shown in FIG. 3, and the hole 7 is opened on the metal sheet 5, so that the axis of the mandrel 1 is aligned with the axis of the hole 7, and the mandrel 1 is passed through the hole 7 slowly from bottom to top, and the fitting portion 103 forms a clearance fit with the hole 7. The fitting tolerance can be H6/h5, H7/h6, H8/h7 and H9/h9, so that the mandrel 1 generates a certain mode of ultrasonic vibration, while the hole circumference is strengthened with laser shock. After the strengthening is completed, the mandrel 1 having a certain mode of ultrasonic vibration is uniformly passed through the hole 7 of the metal sheet 5. Wherein: the breathing ultrasonic vibration frequency of the mandrel 1 is preferably 15 to 60 kHz, the alternating radial amplitude is preferably 2 to 40 μm, and the speed of the mandrel 1 passing through the hole 7 is preferably 10 to 50 mm/min, according to the actual needs of the project, the appropriate parameters can be selected. The location distributions of spots and hole in laser shock strengthening are shown in FIG. 4, and FIG. 5 and FIG. 6 are respectively a side cross-sectional view and a top view of the metal sheet and the hole.

After the above strengthening treatment, on one hand, under the extrusion action of the mandrel 1 with a certain mode of ultrasonic vibration, the residual compressive stress is formed near the inner wall of the hole 7, and the radial residual compressive stress layer is deepened, and the tensile stress can be partially offset under the service condition, to improve the stress environment around the hole 7 and solve the problem of tensile stress generated in the middle of the inner wall of the hole after laser shock strengthening; on the other hand, the hole angle of the hole 7 can be effectively strengthened by laser shock strengthening. The combination of the above two aspects enhances the ability of the material around the hole 7 to resist crack initiation and growth, so that the small hole can be fully strengthened. In addition, the mandrel 1 is in a state of a certain mode of ultrasonic vibration, which can reduce the fictional force, etc. during extrusion, effectively solve the problem of breakage of the mandrel 1 during the extrusion process, and also improve the surface quality of the hole 7 to make the surface smoother.

Figure 7:
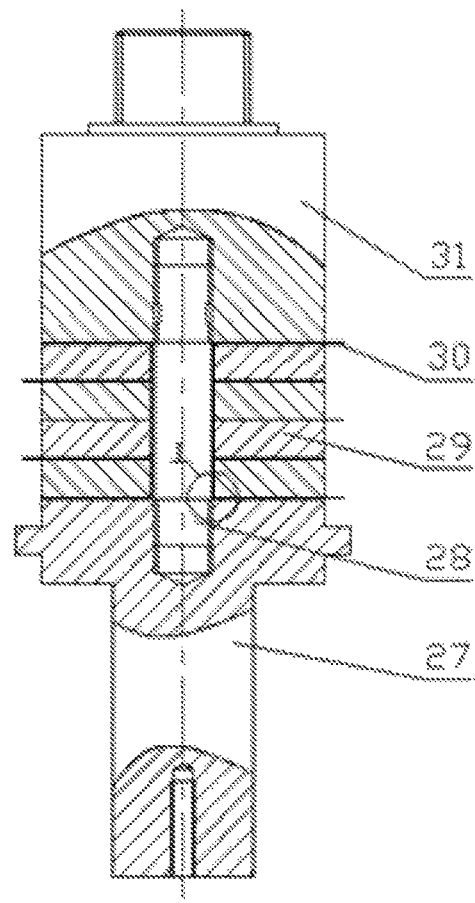
FIG. 7 is a schematic structural view of a transducer according to an embodiment of the present invention.
Figure 8:
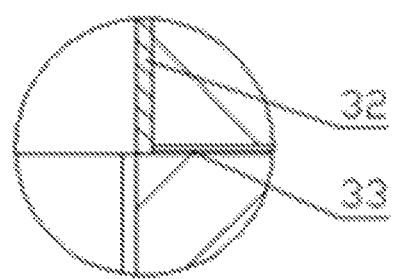
FIG. 8 is an enlarged schematic view of position 1 in FIG. 7.

The vibration assembly of the synergistic strengthening device for laser shock and ultrasonic vibration extrusion of the present invention includes a mandrel 1, a transducer 13, and an ultrasonic generator 18. FIG. 7 and FIG. 8 are schematic structural views of the transducer 13, the mandrel 1 is in threaded connection with the front cover plate 27 of the transducer, and the insulating sheet 33, the electrode sheet 30, and the piezoelectric ceramic 29 are sequentially arranged on the front cover plate 27 of the transducer. The electrode sheets 30 are installed between each pair of piezoelectric ceramics 29, and the uppermost piezoelectric ceramic 29 is sequentially connected with the electrode 30, the insulating sheet 33, and the rear end cover 31 of the transducer, the various parts of the transducer 13 are connected by a pre-tightening screw 28, and the outer surface thereof is covered with an insulating tube 32.

The laser assembly includes an absorbing layer 2, a constraining layer 3, a laser beam 4, and a laser device 14. The absorbing layer 2 is placed on the upper surface of the metal sheet 5, and the constraining layer 3 is placed above the absorbing layer 2, and the laser beam 4 emitted from the laser device 14 is used to perform laser shock strengthening, wherein the absorbing layer 2 is preferably an aluminum foil, and the constraining layer 3 is preferably water.

The hydraulic assembly includes a cylinder barrel 16, a piston rod 20, a piston 21, a nut 22, a cylinder body 23, and a hydraulic pump station 26, the piston rod 20 is mounted inside the cylinder barrel 16. One end of the piston rod 20 is connected to the piston 21 by a nut 22, and the cylinder body 23 is connected to the hydraulic pump station 26 by an oil pipe.

The vibration assembly includes a mandrel 1, a transducer 13, and an ultrasonic generator 18. The mandrel 1 is in threaded connection with the transducer 13 and the ultrasonic generator 18 is connected to the transducer 13 by wires.

The connection assembly includes a clamp 8, a worktable 9, a front end cover 10, a sleeve 11, a transducer guide sleeve 12, a connection sleeve 15, a bracket body 19, and a rear end cover 25. The clamp 8 is mounted on the worktable 9, the front end cover 10 is in threaded connection with the sleeve 11, the sleeve 11 is in threaded connection with the transducer guide sleeve 12, and the transducer guide sleeve 12 is mounted on the worktable 9, the bracket body 19 is connected to the transducer guide sleeve 12 by a screw 17, and the rear end cover 25 is mounted on the cylinder body 23.

The connecting section 101 of the mandrel 1 is in threaded connection with the front cover 27 of the transducer and mounted in the transducer guide sleeve 12, which is mounted on the worktable 9. One end of the piston rod 20 of the hydraulic assembly is connected to the rear cover plate 31 of the transducer via a connecting sleeve 15 and is mounted in the bracket body 19. The bracket body 19 is connected to the transducer guide sleeve 12 by a screw 17. The main function of the hydraulic assembly is subjecting the vibrating assembly to axial tension force so that the mandrel 1 can be passed through the bore 7 to complete strengthening. The clamp 8 is mounted on the bottom plate of the worktable 9, and the main function thereof is to position the hole 7 and clamp the metal sheet 5.

The invention provides a method for synergistic strengthening of laser shock and ultrasonic vibration extrusion. The specific implementation process is as follows:

S1. Pretreating the outer surface of the metal sheet 5 with opened hole 7, and providing absorbing layer 2 and constraining layer 3. Aluminum foil or black lacquer or the like is applied around the hole 7 as the absorbing layer 2, and the main function thereof is to protect the part from being burned by laser and enhance absorption of laser energy. Water is used as the constraining layer 3, the water constraining layer 3 is allowed to flow across the surface of the absorbing layer 2 at a constant rate.

S2. Selecting the size of the mandrel 1, wherein the size of the mandrel fitting section 103 is determined according to the size of the hole to be strengthened and the hole-shaft fitting principle, and the fitting section 103 forms a clearance fit with the hole 7, and the fitting tolerance can be H6/h5, H7/H6, H8/h7 and H9/h9, to ensure the confinement effect of the mandrel 1 in the hole 7. The axial length of the front cone section 104 and the rear cone section 106 is not more than 15 mm, and the surface roughness Ra of the front cone section 104 and the rear cone section 106 is ≤0.2 µm, and the front cone angle and the rear cone angle are preferably 2.5-4°, and if the cone angle is too large, the guiding property of the mandrel 1 is poor, if it is too small, the surface quality of the hole 7 is easily affected. The diameter of the working ring 105 is determined according to the size of the hole to be strengthened. The diameter tolerance should be less than 0.005 mm, and the surface roughness Ra of the working ring 105 is ≤0.1 µm.

S3. Aligning the axis of the mandrel 1 with the axis of the hole 7, and passing the threaded end of the mandrel 1 through the hole 7 from bottom to top slowly, ensuring that the connecting section 101 of the mandrel 1 is in threaded connection with the transducer 13, installing the front end cover 10.

S4. Setting the vibration mode and parameters, wherein the parameters such as vibration frequency and amplitude can be adjusted on the ultrasonic generator 18. The ultrasonic generator 18 is turned on to make the mandrel 1 generate a certain mode of ultrasonic vibration. The ultrasonic vibration adopts a breathing vibration, and the vibration mode can also be changed as needed. The ultrasonic vibration frequency is preferably 15 to 60 kHz, and the alternating radial amplitude is preferably 2 to 40 µm.

S5. Adjusting parameters of the laser device 14, such as spot shape and size, and laser power density. Since the vibrating assembly and the connecting assembly are mounted above the metal sheet 5, the laser beam 4 cannot be vertically irradiated, so the laser incident angle 401 should be greater than 60°, to ensure better laser shock strengthening effect. The running route is controlled, and the outer surface around the hole 7 is strengthened by laser shock. The laser power density is selected according to the material properties of the workpiece and the thickness of the workpiece at the hole position. The laser shock is performed around the hole circumference, and the circumferential spot overlap ratio and the radial spot overlap ratio are both greater than 50%, and one circumferential shocking and one radial shocking forms one pass, and 2 to 3 passes can be repeated; a large-energy annular laser beam can also be used for shocking, at this time the mandrel 1 passes through the center of the annular laser beam, the spots are entirely irradiated around the hole 7 and there is no need to move the spot.

S6. After the laser impact is completed, turning on the extruding device, and passing the mandrel 1 through the hole 7 at a constant speed slowly. The ultrasonic extrusion strengthening between the mandrel 1 and the hole 7 is completed through mutual extrusion between the working ring 105 and the hole 7. The ultrasonic generator 18 is turned off to complete the synergistic strengthening for laser shock and ultrasonic vibration extrusion.

In the actual working process of the present invention, process parameters, such as extrusion speed and extrusion amount, should be set according to the process requirements.

During the ultrasonic vibration extrusion strengthening process, the mandrel is required to pass through the hole continuously and uniformly, so that the hole wall is fully deformed, and no pause, intermittence or impact load is allowed in the extrusion process until the mandrel passes through the hole completely. The speed should not be too slow, because low speed will result in sticking and breaking. When the extrusion speed is too fast, the plastic deformation is insufficient and the lattice structure is unstable. Therefore, the extrusion speed can be selected within 10 to 50 mm/min according to actual engineering needs.

The amount of extrusion is one of the most important process parameters in the strengthening process, which directly affects the fatigue life gain brought by this process. If the amount of extrusion is too small, the elastoplastic deformation area is small, and the resulting strengthening effect is limited; if the amount of extrusion is too large, cracks and microscopic defects are easily generated around the hole, thereby reducing the fatigue life. Therefore, the determination of the range of process parameter of extrusion amount is an important step in the implementation of the process of the present invention. The amount of extrusion mainly depends on the material of the hole to be strengthened, the state of heat treatment, the applied load level, the initial hole diameter, the hole depth, and the hole edge distance. In the method of the present invention, suitable extrusion amount can be selected according to the actual engineering needs, and the ultrasonic extrusion allowance is preferably 1% to 6%, so that the hole is sufficiently strengthened.

EXAMPLES

The hole having a diameter of 2.6 mm in a 6 mm thick metal sheet is strengthened. The outer surface of the metal sheet is pretreated, and an aluminum foil is attached as an absorbing layer 2 around the hole, and water is used as the constraining layer 3, so that water flows uniformly across the surface of the aluminum foil. The model and size of the mandrel 1 are selected, the diameter of the mandrel fitting section 103 is 2.6 mm, and the fitting section 103 forms a clearance fit with the hole 7, with a tolerance of H7/h6, which ensures the restraining effect of the mandrel 1 in the hole 7. The axial length of the front cone section 104 and the rear cone section 105 of the mandrel is 6 mm, and the surface roughness Ra of the front cone section 104 and the rear cone section 105 is 0.2 µm, a front cone angle and a rear cone angle are 3, and the diameter of the working ring is determined according to the size of the hole 7 to be strengthened. The amount of extrusion in this example is 3%, so the diameter of the working ring 105 is 2.678 mm, the diameter tolerance is less than 0.005 mm, and the surface roughness Ra of the working ring is 0.1 µm. The axis of the mandrel 1 is aligned with the axis of the hole 7, the threaded end of the mandrel 1 is slowly passed through the hole from bottom to top, ensuring that the connecting section 101 of the mandrel 1 is in threaded connection with the transducer 13, and the front end cover 10 is mounted. The ultrasonic generator 18 is adjusted to set the vibration mode and parameters. In this example, the ultrasonic vibration adopts a breathing vibration, the ultrasonic vibration frequency is 40 kHz, and the alternating radial amplitude is 20 µm. The ultrasonic generator 18 is turned on to make the mandrel 1 generate ultrasonic vibration. The parameters of the laser device is adjusted, the specific parameters are as follows: spot diameter 1 mm, energy 2G, pulse width 20.1 ns, wavelength 1.054 µm. The laser device running path is controlled and the laser incident angle is 70°, and the outer surface around the hole is strengthened by laser shock. The circumferential spot overlap rate and the radial spot overlap ratio are both 60%, and one circumferential shock and one radial shock form one pass, and two passes are repeated. After the laser shock is completed, the hydraulic pump station (26) is opened, the hydraulic assembly is started, the mandrel 1 is passed through the hole 7 at a constant speed slowly, and the extrusion speed is 20 mm/min, and the ultrasonic extrusion strengthening between the mandrel 1 and the hole 7 is completed by the mutual extrusion between the working ring 105 and the hole 7. After the end of the extrusion strengthening, the ultrasonic generator 18 is turned off, and the synergistic strengthening for laser shock and the ultrasonic vibration extrusion is finished.

After synergistic strengthening of laser shock and ultrasonic vibration extrusion, the hole 7 is fully strengthened. FIG. 9 shows the stress distribution comparison of the hole wall. The x-coordinate is the distance from surface A to surface B in the thickness direction, and the y-coordinate is the stress. FIG. 5 shows the surface A 501 of the metal sheet and surface B 502 of the metal sheet. The curve 701 is the stress of the hole wall strengthened by the laser shock, the curve 702 is the stress of the hole wall which is synergistically strengthened by the laser shock and the ultrasonic vibration extrusion, and the curve 703 is the stress of the hole wall strengthened by the ultrasonic vibration extrusion. After a single laser shock strengthening, a tensile stress of about 50 MPa is generated in the middle of the inner wall of the hole. After a single ultrasonic vibration extrusion strengthening, the residual compressive stress of the hole angle is small, and the strengthening effect is not obvious. When compared with the synergistic strengthening of laser shock and ultrasonic vibration extrusion, the residual compressive stress of the hole angle is reduced by about 150 MPa. After synergistic strengthening of laser shock and ultrasonic vibration extrusion, the hole is comprehensively strengthened, and the residual compressive stress distribution is uniform and reasonable.

FIG. 10 shows stress distribution comparison of the middle section of the hole wall, the x-coordinate is the distance in the Y direction from the middle section of the hole wall, as shown in FIG. 10, the Y direction is away from the middle section of the hole wall, and the y-coordinate is the stress. Curve 704 is the stress in the middle section of the hole wall strengthened by laser shock, and there is only a tensile stress of about 50 MPa in the middle section of the hole wall. The curve 705 is the stress in the middle section of the hole wall strengthened by the ultrasonic vibration extrusion, and the curve 706 is the stress in the middle section of the hole wall which is synergistically strengthened by the laser shock and the ultrasonic vibration extrusion. After synergistic strengthening of the laser shock and the ultrasonic vibration extrusion, the residual compressive stress is generated at the middle section of the hole wall, and the residual compressive stress is about 1.3 times of the residual compressive stress generated in single ultrasonic vibration extrusion strengthening, and the strengthening effect is more obvious.

FIG. 11 shows comparison of the surface stress distribution. The x-coordinate is the distance in the Y direction from the edge of the hole, as shown in FIG. 11, the Y direction is away from the edge of the hole, and the y-coordinate is stress. Curve 707 is the surface stress of laser shock strengthening, curve 708 is the surface stress of ultrasonic vibration extrusion strengthening, and curve 709 is the surface stress of synergistic strengthening of laser shock and ultrasonic vibration extrusion. It can be seen from the stress comparison diagram that the single ultrasonic vibration extrusion strengthening results in a shallower residual compressive stress layer. After synergistic strengthening of the laser shock and ultrasonic vibration extrusion, the residual compressive stress layer of the hole is about 0.5 mm deeper than that of the single laser shock strengthening, and the peak of the tensile stress is about 50 MPa smaller. The hole has been comprehensively strengthened from the surface to the inner wall, and the defects of single laser shock strengthening and single ultrasonic vibration extrusion strengthening are overcome.

It should be understood that, although the description has been described in terms of various embodiments, it is not intended that each embodiment include only one independent technical solution. The description adopts such narration mode merely for the sake of clarity and the person skilled in the art should consider the description as a whole. The technical solutions in the respective embodiments may also be combined as appropriate to form other embodiments that can be understood by the person skilled in the art.

The series of detailed descriptions set forth above are merely illustration of feasible embodiments of the present invention, and are not intended to limit the scope of the present invention. Equivalent embodiments or modifications which do not depart from the spirit of the invention are intended to be included within the scope of the invention.

The invention claimed is:

1. A synergistic strengthening device for laser shock and ultrasonic vibration extrusion, characterized in that, it comprises a laser assembly, a vibration assembly, a hydraulic assembly and a connecting assembly, the laser assembly comprises an absorbing layer (2), a constraining layer (3), a laser beam (4) and a laser device (14); the absorbing layer (2) is placed on the upper surface of a metal sheet (5), the constraining layer (3) is placed above the absorbing layer (2), and the laser device (14) is located above the metal sheet (5) and emits the laser beam (4) to strengthen a hole (7) on the upper surface of the metal sheet (5) by laser shock and the generated laser is guided above the surface of the metal sheet (5) by the laser device;

the vibration assembly includes a mandrel (1), a transducer (13) and an ultrasonic generator (18); the mandrel (1) includes a connecting section (101), a guiding section (102), a fitting section (103), a front cone section (104), a working ring (105) and a rear cone section (106) which are sequentially connected; the ultrasonic generator (18) is electrically connected to the transducer (13);

the hydraulic assembly includes a cylinder barrel (16), a piston rod (20), a piston (21), a cylinder body (23) and a hydraulic pump station (26); the piston rod (20) is mounted inside the cylinder barrel (16), one end of the piston rod (20) is connected to the piston (21), and the other end of the piston rod (20) is connected to a rear cover plate (31) of the transducer through a connecting sleeve (15) and installed in a bracket body (19), the cylinder body (23) is connected to the hydraulic pump station (26) by an oil pipe;

the connecting assembly comprises a clamp (8), a worktable (9), a front end cover (10), a sleeve (11), a transducer guiding sleeve (12), a connecting sleeve (15), a bracket body (19) and a rear end cover (25); the clamp (8) is mounted on the worktable (9), and the front end cover (10) is connected to one end of the sleeve (11), the other end of the sleeve (11) is in threaded connection with one end of the transducer guiding sleeve (12), the transducer guiding sleeve (12) is mounted on the worktable (9), one end of the bracket body (19) is connected with the other end of the transducer guiding sleeve (12), the other end of the bracket body (19) is connected to the lower end of the cylinder body (23), and the rear end cover (25) is mounted on the upper end of the cylinder body (23); the connecting section (101) of the mandrel (1) is connected to the transducer (13) and mounted in the transducer guiding sleeve (12); and the mandrel (1) is mounted on the transducer (13) and connected to the hydraulic assembly by the connecting sleeve (15), and the mandrel (1) passes through the hole (7) on the metal sheet (5) equipped with the absorbing layer (2) and the constraining layer (3), forming a clearance fit.

2. The synergistic strengthening device for laser shock and ultrasonic vibration extrusion according to claim 1, wherein, the axial length of the front cone section (104) and the rear cone section (106) of the mandrel (1) is not more than 15 mm, the surface roughness Ra of the front cone section (104) and the rear cone section (106) is ≤0.2 μm, and the front cone angle and the rear cone angle are 2.5-4°; and the surface roughness Ra of the working ring (105) is ≤0.1 μm.

3. The synergistic strengthening device for laser shock and ultrasonic vibration extrusion according to claim 1, wherein, the transducer (18) includes a front cover plate (27) of the transducer, pre-tightening screws (28), piezoelectric ceramics (29), electrode sheets (30), a rear end cover (31) of the transducer, insulating tubes (32) and insulating sheets (33);

the connecting section (101) of the mandrel (1) is in threaded connection with the front cover plate (27) of the transducer, and the insulating sheet (33), the electrode sheet (30) and the piezoelectric ceramic (29) are sequentially arranged on the front cover plate (27) of the transducer, and the electrode sheet (30) is installed between each pair of piezoelectric ceramics (29), the uppermost piezoelectric ceramic (29) is sequentially connected with the electrode sheet (30), the insulating sheet (33) and the rear end cover (31) of the transducer, and the various parts of the transducer (13) are connected by the pre-tightening screw (28), and the outer surface of the pre-tightening screw (28) is covered with the insulating tube (32).

4. A method for utilizing the synergistic strengthening device for laser shock and ultrasonic vibration extrusion according to claim 1, characterized in that, it uses laser shock strengthening and ultrasonic vibration extrusion strengthening to strengthen an opened hole (7) in the metal sheet (5) simultaneously, and the mandrel (1) is in a clearance fit with the hole (7) to constrain the hole (7), when the laser shocks the outer surface of the metal sheet (5), the mandrel (1) in the hole (7) applies ultrasonic vibration, power ultrasound with a certain frequency, amplitude and mode interacts with the laser shock wave to form a three-dimensional compressive stress distribution at a certain depth near the hole wall of the hole (7), including the following steps:

S1. pretreating the outer surface of the metal sheet (5) with the opened hole (7), firstly providing an absorbing layer (2) on the outer surface of the metal sheet (5), and then providing a constraining layer (3) on the absorbing layer (2);

S2. selecting the type and size of the mandrel (1) according to the size of the hole (7), and loosely fitting the fitting section (103) of mandrel with the hole (7);

S3. after the axis of the mandrel (1) is aligned with the axis of the hole (7), the mandrel (1) is passed through the hole (7), the connecting section (101) of the mandrel (1) is connected with the transducer (13), and the rear cover plate (31) of the transducer is connected with the piston rod of the hydraulic assembly;

S4. connecting the ultrasonic generator (18) with the transducer (13) electrically, setting the vibration mode and parameters of the ultrasonic generator (18), and turning on the ultrasonic generator (18) so that the mandrel (1) generates the mode of ultrasonic vibration;

S5. adjusting the spot shape, the spot size and the laser power density of the laser device (14) above the metal sheet (5), and performing laser shock strengthening on the outer surface around the hole (7) while the mandrel (1) generates the mode of ultrasonic vibration; and S6. after the laser shock is completed, turning on the hydraulic pump station (26), starting the hydraulic assembly, passing the mandrel (1) through the hole (7) slowly, turning off the ultrasonic generator (18), and finishing synergistic strengthening for laser shock and ultrasonic vibration extrusion.

5. The method for synergistic strengthening of laser shock and ultrasonic vibration extrusion according to claim 4, wherein, in step S1, the absorbing layer (2) is an aluminum foil, and the constraining layer (3) is water.

6. The method for synergistic strengthening of laser shock and ultrasonic vibration extrusion according to claim 4, wherein, in step S4, the ultrasonic generator (18) adopts a breathing vibration; the ultrasonic vibration frequency is 15 to 60 kHz, the alternating radial amplitude is 2 to 40 μm; and the velocity of the mandrel (1) through the hole (7) is 10 to 50 mm/min.

7. The method for synergistic strengthening of laser shock and ultrasonic vibration extrusion according to claim 4, wherein, in step S5, the laser shocking position of the laser device (14) is around the circumference of the hole (7), and the circumferential spot overlap ratio and the radial spot overlap ratio are both greater than 50%.

8. The method for synergistic strengthening of laser shock and ultrasonic vibration extrusion according to claim 4, wherein, in the step S5, the laser incident angle (401) of the laser device (14) is greater than 60°.

9. The method for synergistic strengthening of laser shock and ultrasonic vibration extrusion according to claim 4, wherein, in the step S6, the ultrasonic extrusion strengthening between the mandrel (1) and the hole (7) is finished by mutual extruding between the working ring (105) of the mandrel (1) and the hole (7), and the ultrasonic extrusion allowance is maintained at 1% to 6%.

\* \* \* \* \*